United States Patent Office 2,999,860
Patented Sept. 12, 1961

2,999,860
2-SUBSTITUTED DERIVATIVES OF 7-ALKOXY-1,2,3,4 TETRAHYDRO-8H-PYRIDO[1.2.]PYR-AZIN - 8 - ONES AND 7 - ALKOXY - 1,2,3,4,5,9-HEXAHYDROPYRIDO [1.2] [1.4] DIAZEPIN-9-ONES AND THEIR DERIVATIVES
Carl Peter Krimmel, Mundelein, Ill., assignor to G. D. Searle & Co., Chicago, Ill., a corporation of Delaware
No Drawing. Filed July 6, 1959, Ser. No. 824,929
11 Claims. (Cl. 260—268)

The present invention relates to a new group of heterocyclic compounds and, more particularly, to the 2-substituted derivatives of 7-alkoxy-1,2,3,4-tetrahydro-8H-pyrido[1.2]pyrazin-8-ones and 7-alkoxy-1,2,3,4,5,9-hexahydropyrido[1.2][1.4]diazepin-9-ones and their preparation. These compounds can be represented as the bases of the general structural formula

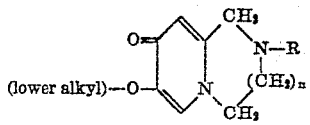

wherein R is either a lower alkyl or a lower hydroxyalkyl radical and $n$ is either 1 or 2.

In the foregoing structural formula the lower alkyl groups can be methyl, ethyl, straight-chain or branched propyl, butyl, amyl, or hexyl. In addition, the radical R can represent a lower alkyl radical of the same type with a hydroxy substituent.

The organic bases of this invention form pharmaceutically acceptable non-toxic salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methyallyl bromide and crotyl bromide.

The compounds of this invention can be prepared conveniently using kojic acid as a starting material. Kojic acid is first converted to a 1-hydroxymethyl-5-alkoxy-4-pyrone which is then reacted with a hydroxyalkylamine of the formula $$H_2N—CH_2—(CH_2)_n—OH$$

by a procedure such as that of Campbell et al. (J. Org. Chem. 15, 221; 1950), to yield a 1-(ω-hydroxyalkyl)-2-hydroxymethyl-5-alkoxy-4-pyridone of the structural formula

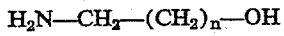
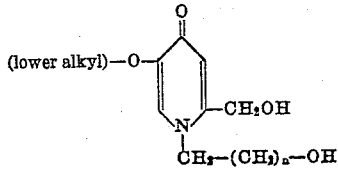

Heating of these compounds with thionyl chloride converts both hydroxy groups to chloro groups. The resulting 1 - (ω-chloroalkyl) - 2 - chloromethyl-5-alkoxy-4-pyridones have fungicidal activities against organisms of the type of Trichophyton mentagrophytes. They are also valuable intermediates for the preparation of the pyridopyrazines and pyridoazepines illustrated above. Thus, reaction with a monoalkyl amine or a hydroxyalkylamine yields the 2-alkyl or 2-hydroxyalkyl derivatives of the first formula shown herein. Reaction with a dialkylamine of the formula $R_2NH$, on the other hand, leads to the formation of the quarternary salt of the formula

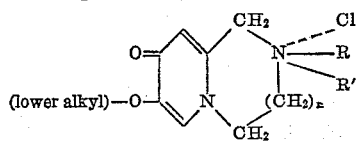

Further treatment of these pyridopyrazinium and pyridodiazepinium salts with a strong acid such as hydrochloric acid leads to the formation of an acid addition salt.

Two alternative processes are available for the preparation of these dicyclic compounds. Thus heating of a 2-hydroxymethyl-5-alkoxy-4-pyrone with a 2-dialkylaminoalkylamine yields a 1-(2-dialkylaminoethyl)-2-hydroxymethyl-5-alkoxy-4-pyridone which, on contacting with thionyl chloride, is converted to the corresponding dihydrochloride of a 1-(2-dialkylaminoethyl)-2-chloromethyl-5-alkoxy-4-pyridone. This can be made to undergo ring closure by heating with an amine such as aminopentane to yield the corresponding 2,2-dialkyl-7-alkoxy-8 - oxo - 1,2,3,4 - tetrahydro - 8H - pyrido[1.2]pyrazinium chloride corresponding to the preceding general formula.

Heating of a 1 - (2 - dialkylaminoethyl) - 2 - hydroxyethyl-5-alkoxy-4-pyridone with thionyl chloride can also be made to yield, directly, the hydrochloride of a 2,2-dialkyl-7-alkoxy-8-oxo-1,2,3,4-tetrahydro - 8H - pyrido[1.2] pyrazinium chloride. The hydrogen chloride can be removed from this product by heating with an amine such as aminopentane.

The 2-substituted derivatives of 7-alkoxy-1,2,3,4-tetrahydro-8H-pyrido[1.2]pyrazine-8-ones and 7-alkoxy-1,2,3, 4,5,9-hexahydropyrido[1.2][1.4]diazepin-9-ones of this invention have valuable pharmacological properties. They are fungicides effective against organisms of the type of Trichophyton mentagrophytes. They also inhibit the action of hyaluronidase and have some ganglion blocking activity.

The compounds of the first formula given hereinabove wherein R represents a hydroxyalkyl group can be esterified with the acid halides of alkanoic acids and especially of alkanoic acids with aromatic substituents such as the phenylalkanoic acids and the polyphenylalkanoic acids to prepare pharmacologically valuable esters, e.g. central nervous depressants.

The invention will appear in further detail from the following examples which are given for the purposes of illustration only and are not to be construed as limiting the invention in spirit or in scope.

Example 1

To a solution of 10 ml. of thionyl chloride and 20 ml. of chloroform is added with stirring 2.0 g. of 1-(2-hydroxyethyl) - 2 - hydroxymethyl - 5 - methoxy-4-pyridone.

After evolution of hydrogen chloride has subsided, the reaction mixture is refluxed on the steam bath for 30 minutes. During this interval, an oily phase separates from the reaction mixture. As refluxing is continued, the oily phase becomes crystalline. The crystals are filtered, washed with petroleum ether, and air-dried. After recrystallization by dissolving in refluxing absolute ethanol and diluting with anhydrous benzene, the hydrochloride of 1-(2-chloroethyl)-2-chloromethyl-5-methoxy-4-pyridone is obtained. It is a white, water-soluble compound melting between 190–196° C.

The hydrogen chloride can be removed from the above compound by treatment with concentrated ammonium hydroxide. Thus, 5.0 g. of the hydrochloride is added to 40 ml. of concentrated ammonium hydroxide at room temperature. Dissolution takes place at once followed by the separation of white crystals from the reaction mixture. After suction filtration and air drying, the product is recrystallized from butanone to give 1-(2-chloroethyl)-2-chloromethyl-5-methoxy-4-pyridone melting at about 151–152° C.

By substituting 2.1 g. of 1-(2-hydroxyethyl)-2-hydroxymethyl-5-ethoxy-4-pyridone as starting material, 1-(2-chloroethyl)-2-chloromethyl-5-ethoxy-4-pyridone and its hydrochloride can be obtained.

*Example 2*

A mixture of 14 g. of 1-(3-hydroxypropyl)-2-hydroxymethyl-5-methoxy-4-pyridone, 40 ml. of thionyl chloride, and 150 ml. of chloroform is refluxed on the steam bath for 15 minutes. The reaction mixture is concentrated to half-volume by evaporation in an open vessel and then cooled. Scratching of the oily phase yields crystals. These are filtered, washed with petroleum ether, and air-dried. After recrystallization from anhydrous isopropanol the hydrochloride of 1-(3-chloropropyl)-2-chloromethyl-5-methoxy-4-pyridone is obtained. It melts between 169–177° C.

The hydrogen chloride can be removed from the above compound by treatment with concentrated ammonium hydroxide as in the preceding example. After recrystallization from 2-butanone, the base melts at about 117–120° C.

*Example 3*

A solution of 300 mg. of 1-(2-chloroethyl)-2-chloromethyl-5-methoxy-4-pyridone hydrochloride in 3 ml. of absolute ethanol is mixed with a solution of 320 mg. of diethylamine in 3 ml. of absolute ethanol. The reaction mixture is refluxed on the steam bath for one hour and cooled to room temperature. Anhydrous ethyl ether is then added with stirring until the first signs of permanent turbidity appear. Scratching and standing cause a white precipitate to appear. Seed crystals will facilitate this somewhat difficult induction of precipitation. The precipitate is suction filtered and dried in the steam cabinet. It is recrystallized by dissolution in absolute ethanol at room temperature, seeding, and ether dilution. The product consists of white, water-soluble crystals melting at about 258–261° C. with decomposition to a red frothy liquid. The 2,2-diethyl-7-methoxy-8-oxo-1,2,3,4-tetrahydro-8H-pyrido[1.2]pyrazinium chloride thus produced has the structural formula

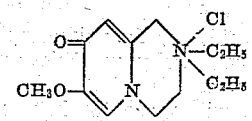

By substituting 322 mg. of 1-(2-chloroethyl)-2-chloromethyl-5-ethoxy-4-pyridone hydrochloride as starting material there is obtained 2,2-diethyl-7-ethoxy-8-oxo-1,2,3,4-tetrahydro-8H-pyrido[1.2]pyrazinium chloride.

*Example 4*

To a stirred solution of 1.0 g. of 2,2-diethyl-7-methoxy-8-oxo-1,2,3,4-tetrahydro-8H-pyrido[1.2]pyrazinium chloride dissolved in 10.0 ml. of methanol is added an equivalent of anhydrous hydrogen chloride-isopropanol solution containing 0.265 g. of hydrogen chloride per milliliter. The resulting solution is diluted with 60 ml. of acetone. A flocculent gel is precipitated. By scratching, stirring, and heating on the steam bath this gel is reduced to a crystalline precipitate. The precipitate is filtered, washed with acetone, and dried in the steam cabinet. This white, water-soluble, crystalline hydrochloride of 2,2-diethyl-7-methoxy-8-oxo-1,2,3,4-tetrahydro-8H-pyrido[1.2]pyrazinium chloride melts at about 224–226° C. to a frothy white liquid.

*Example 5*

A solution of 8.2 g. of 1-(2-chloroethyl)-2-chloromethyl-5-methoxy-4-pyridone hydrochloride in 30 ml. of absolute ethanol and a solution of 12.1 g. of di-n-propylamine in 30 ml. of absolute ethanol are mixed and refluxed on the steam bath for one hour. The reaction mixture is diluted with 300 ml. of butanone and seeded with a homolog such as 2,2-diethyl-7-methoxy-8-oxo-1,2,3,4-tetrahydro-8H-pyrido[1.2]pyrazinium chloride. The resultant crystalline precipitate is filtered and dried in the steam cabinet. It is recrystallized from hot anhydrous isopropanol and dried at 100° C. for 5 hours in a vacuum to give water-soluble, crystalline 2,2-dipropyl-7-methoxy-8-oxo-1,2,3,4-tetrahydro-8H-pyrido[1.2] pyrazinium chloride melting at about 229–232° C. with decomposition to a frothy orange liquid.

*Example 6*

A mixture of 46.2 g. of 1-(2-chloroethyl)-2-chloromethyl-5-methoxy-4-pyridone hydrochloride and an ice-cold solution of 30.0 g. of ethylamine in 150 ml. of absolute ethanol is sealed in an ice-cold glass-lined bomb. The bomb is rocked and maintained at 86–102° C. for one hour under a nitrogen pressure of 200–260 p.s.i. The bomb is then cooled to room temperature.

To the stirred reaction mixture, an excess of anhydrous hydrogen chloride-isopropanol solution is added, specifically, 80 ml. of a solution containing 0.265 g. of hydrogen chloride per milliliter. The resultant slurry is washed by suspension in cold absolute ethanol, filtered, and dried in the steam cabinet. The dried product is recrystallized from hot absolute ethanol and decolorizing carbon. After drying for 6 hours at 100° C. in vacuo, the dihydrochloride of 2-ethyl-7-methoxy-1,2,3,4-tetrahydro-8H-pyrido[1.2]pyrazin-8-one is obtained as white, water-soluble crystals melting at 222–227° C. with decomposition to a frothy orange material.

The free base can be obtained by treating an aqueous solution of the dihydrochloride with excess potassium carbonate and extracting with chloroform.

*Example 7*

A mixture of 4.1 g. of 1-(2-chloroethyl)-2-chloromethyl-5-methoxy-4-pyridone hydrochloride, 5.2 g. of 1-aminopentane and 20 ml. of absolute ethanol is stirred and refluxed on the steam bath for one hour. The reaction mixture is cooled and made acid with a solution of hydrogen chloride in anhydrous isopropanol containing 0.25 g. of hydrogen chloride per ml. After the reaction mixture sets to a thick slurry, 50 ml. of anhydrous isopropanol is added to aid in filtration. The slurry is suction filtered using a rubber dam. The filter cake is transferred to a drying cabinet with as little exposure to moist air as possible. The dry product is dissolved in the smallest quantity of hot methanol in which it will dissolve. This hot solution is then diluted with twice its volume of anhydrous isopropanol. The solution is concentrated to half-volume on the steam bath. Cooling gives a white, crystalline slurry which is suction filtered using a rubber dam. The filter cake is washed by suspension in ethyl acetate, suction filtered using a rubber dam, and dried in a steam cabinet. The product is recovered as white, water-soluble microcrystals melting at 206–212° C. with decomposition to a frothy orange material. The 2-pentyl-7-methoxy-1,2,3,4-tetrahydro-8H-pyrido[1.2]pyrazin-8-one thus obtained has the structural formula

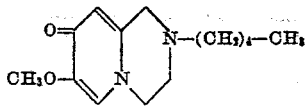

Example 8

A solution of 4.4 g. of 2-aminoethanol in 20 ml. of absolute ethanol is added to 5.0 g. of 1-(2-chloroethyl)-2-chloromethyl-5-methoxy-4-pyridone hydrochloride. The reaction is exothermic and suitable allowances are therefore made in larger runs during the addition and subsequent heating. The reaction mixture is stirred and refluxed on the steam bath for one hour and cooled. To the stirred reaction mixture is added 7 ml. of anhydrous hydrogen chloride-isopropanol solution having a concentration of 0.265 g. of hydrogen chloride per milliliter. This treatment is followed by the addition of 200 ml. of anhydrous isopropanol. A gum is precipitated. This gum is crystallized by scratching and warming on the steam bath or more conveniently by the addition of homologous seed crystals.

The crystallized gum is dissolved in 10 ml. of hot methanol, treated with decolorizing carbon and filtered. The filtrate is diluted with 20 ml. of anhydrous isopropanol, seeded, and warmed gently. The resultant crystals are filtered, washed on the filter with isopropanol, and dried in the steam cabinet. The product consists of white, water-soluble crystals melting at about 194–196° C. to a clear frothy liquid. It is the dihydrochloride of 2,-(2-hydroxyethyl)-7-methoxy-8H-pyrido[1.2]pyrazin-8-one of the structural formula

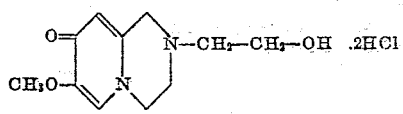

Example 9

A solution of 5.4 g. of 3-amino-1-propanol in 20 ml. of absolute ethanol is added to 5.0 g. of 1-(2-chloroethyl)-2-chloromethyl-5-methoxy-4-pyridone hydrochloride. The reaction is exothermic and suitable allowances are therefore made in larger runs during the addition and subsequent heating. The reaction mixture is stirred and refluxed on the steam bath for one hour and cooled. To the stirred reaction mixture is added 7 ml. of hydrogen chloride-isopropanol solution having a concentration of 0.265 g. of hydrogen chloride per milliliter. If seed crystals are available, the introduction of the seeds at this point and dilution with fresh isopropanol and gradual warming on the steam bath will lead directly to a crystalline precipitate. Lacking the seeds, a gelatinous white precipitate is formed. This gel is vigorously stirred and then allowed to stand in a covered vessel for one hour. It is suction filtered using a rubber dam. It is washed with isopropanol and dried in the steam cabinet. It is recrystallized by dissolving in a minimum of hot methanol, treating with decolorizing carbon, and filtering. The filtrate is diluted with an equal volume of anhydrous isopropanol, seeded, and filtered. After drying in the steam cabinet, the filter cake consists of white, water-soluble, non-hygroscopic crystals melting at about 205–209° C. with gassing to form a frothy white liquid.

An aqueous solution of 5.0 g. of 2-(3-hydroxypropyl)-7-methoxy-1,2,3,4-tetrahydro-8H-pyrido[1.2]pyrazin-8-one dihydrochloride thus obtained is saturated with potassium carbonate. The mixture is extracted with three 50 ml. portions of chloroform. The chloroform extracts are combined and dried over potassium carbonate. The dried chloroform solution is evaporated on the steam bath to a clear, colorless viscous, syrup. The syrup is crystallized by scratching. It is recrystallized by dissolving in 10 ml. of refluxing isopropanol, adding 30 ml. of butanone to the hot isopropanol solution and cooling. The solid product is filtered and dried in the steam cabinet. It consists of white, water-soluble crystals of 2-(3-hydroxypropyl)-7-methoxy-1,2,3,4-tetrahydro-8H-pyrido[1.2]pyrazin-8-one melting at about 158–160° C. to a colorless liquid.

Example 10

By the procedure of the preceding example, 10.9 g. of 1-(2-chloroethyl)-2-chloromethyl-5-methoxy-4-pyridone hydrochloride and 14.2 g. of 4-amino-2-butanol are reacted in 30 ml. of absolute ethanol. Following the reaction, the product is recovered as a white gelatinous precipitate by adding a hydrogen chloride-isopropanol solution containing 3.9 g. of hydrogen chloride in 415 ml. of anhydrous isopropanol. The precipitate is suction filtered using a rubber dam. It is washed on the filter with isopropanol, washed by suspension in butanone, and dried in the steam cabinet. Dissolution in hot anhydrous isopropanol and cooling again yields a white gel. After suction filtering with a rubber dam, drying in the steam cabinet, and comminuting, the 2-(3-hydroxbutyl)-7-methoxy-1,2,3,4-tetrahydro-8H-pyrido-[1.2]pyrazin-8-one dihydrochloride is obtained as a white, water-soluble, powder melting at 175–179° C. with gassing to a white frothy liquid.

Example 11

By the procedure of the preceding example, 6.0 g. of 1-(3-chloropropyl)-2-chloromethyl-5-methoxy-4-pyridone hydrochloride and 6.3 g. of 3-amino-1-propanol are caused to react in 25 ml. of absolute ethanol. Following the reaction, the product is recovered as a crystalline precipitate by adding a hydrogen chloride-isopropanol solution containing 2.7 g. of hydrogen chloride in 310 ml. of anhydrous isopropanol. The isopropanol solution is then concentrated to a volume of approximately 200 ml., cooled, scratched, and seeded with a homolog.

The crystalline product is filtered, washed on the filter with isopropanol, and dried in the steam cabinet. It consists of white, water-soluble crystals melting at 198–201° C. with gassing to a white frothy liquid. The dihydrochloride of 2-(3-hydroxypropyl)-8-methoxy-1,2,3,4,5,9-hexahydropyrido[1.2][1.4]diazepin-9-one thus obtained has the structural formula

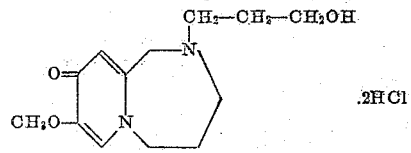

Substitution of 5.0 g. of 1-aminopropane for the aminopropanol used in the foregoing procedure yields the dihydrochloride of 2-propyl-8-methoxy-1,2,3,4,5,9-hexahydropyrido[1.2][1.4]diazepin-9-one of the structural formula

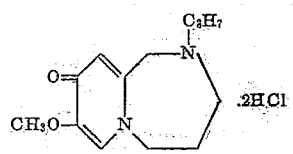

Example 12

To a solution of 6.0 g. of 2-(3-hydroxypropyl)-7-methoxy-1,2,3,4-tetrahydro-8H-pyrido[1.2]pyrazin-8-one in 100 ml. of chloroform is added 5.8 g. of diphenylacetyl chloride. The reaction mixture is refluxed for two hours, cooled, and extracted with water. The chloroform layer is retained and extracted with 25% hydrochloric acid. The hydrochloric acid extract is retained and saturated with potassium carbonate to release an oil. This oil is taken up in chloroform, dried, and the dried chloroform is evaporated on the steam bath to a viscous syrup. The product is recovered as the dihydrochloride by treating the syrup with an excess of anhydrous hydrogen chloride-isopropanol solution. The resultant solid is comminuted under fresh anhydrous isopropanol, washed by suspension in anhydrous isopropanol, and dried in an oven at 100° C. All of these operations are carried out promptly to avoid excessive uptake of moisture by the damp solid. The dry, non-hygroscopic product melts at 185–190° C. with gassing. The dihydrochloride of 2-(3-diphenylacetoxypropyl)-7-methyl-1,2,3,4-tetrahydro-8H-pyrido[1.2]pyrazin-8-one thus obtained has the structural formula

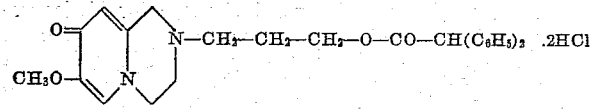

Example 13

A mixture of 31.2 g. of 2-hydroxymethyl-5-methoxy-4-pyrone, 23.2 g. of 2-diethylaminoethylamine and 40 ml. of water is stirred and refluxed on the steam bath for 20 minutes. The reaction mixture is stripped of water by vacuum distillation on the steam bath.

Several drops of the residue are dissolved in isopropanol, diluted with anhydrous ethyl ether and/or benzene and dried over calcium sulfate. Seed crystals are obtained by scratching and cooling in an ice-bath.

The main body of the residue is dissolved in 600 ml. of hot ethyl acetate, treated with decolorizing carbon, filtered, cooled, and seeded. The resultant solid is recrystallized from hot ethyl acetate to give water-soluble crystalline 1 - (2-diethylaminoethyl)-2-hydroxymethyl-5-methoxy-4-pyridone melting at about 90–93° C.

To a stirred solution of 50.0 g. of 1-(2-diethylaminoethyl)-2-hydroxymethyl-5-methoxy-4-pyridone in 200 ml. of chloroform, 75 g. of thionyl chloride is added. Addition is at such a rate as to initiate gentle reflux. Refluxing is contained for 10 minutes on the steam bath. During this operation, both an orange oily phase and a solid phase separate from the reaction mixture. The reaction mixture is cooled causing substantial solidification of the oil phase.

The solids are removed by suction filtration and the filter cake is washed by suspension in anhydrous ethyl ether. During each of these filtrations, the filter cake is exposed to atmospheric moisture as little as possible since it is hygroscopic under the conditions of the filtrations. The filter cake is dissolved in 200 ml. of warm methanol, treated with decolorizing carbon, filtered and cooled.

The methanol solution is seeded with the solid previously obtained. It is then slowly diluted with 1800 ml. of acetone with stirring and gentle warming. Disregard for these conditions may cause setting to a stiff voluminous gel. Employment of these conditions should result in a crystalline solid which may be accompanied by partial gel formation. In this case, continued warming and scratching will convert the gel particles to a crystalline product which is suction filtered and dried in the steam cabinet. The 2,2-diethyl-7-methoxy-8-oxo-1,2,3,4-tetrahydro-8H-pyrido[1.2]pyrazinium chloride hydrochloride thus obtained melts at about 222–225° C. to a colorless frothy liquid.

The acetone-methanol filtrate, obtained above, is concentrated to a viscous orange syrup by evaporation in the hood at room temperature. The syrup is treated with 100 ml. of acetone and stirred and scratched until it crystallizes. It is recrystallized by dissolving in 50 ml. of warm methanol, cooling, and slowly adding 500 ml. of acetone with stirring and seeding. The crystalline product is filtered and dried in the steam cabinet. It is 1 - (2 - diethylaminoethyl) - 2 - chloromethyl - 5 - methoxy-4-pyridone dihydrochloride.

Example 14

To a stirred suspension of 0.7 g. of 1-(2-diethylaminoethyl)-2-chloroethyl-5-methoxy-4-pyridone dihydrochloride in 10 ml. of absolute ethanol is added 0.7 g. of 1-aminopentane. The reaction mixture is refluxed one hour. The clear solution thus obtained is diluted with 10 ml. of anhydrous ethyl ether. A white precipitate is formed. It is suction filtered, washed with cold absolute ethanol, and dried in the steam cabinet. The water-soluble crystals of 2,2-diethyl-7-methoxy-8-oxo-1,2,3,4-tetrahydro-8H-pyrido[1.2]pyrazinium chloride melt at about 255–257° C. with decomposition to a frothy red liquid.

A particularly convenient synthesis of the above quaternary salt can also be effected by directly treating the unseparated products of the preceding example with 1-aminopentane, for either product, treated with 1-aminopentane, yields this salt. If desired, the hydrochloride of 2,2-diethyl-7-methoxy-8-oxo-1,2,3,4-tetrahydro-8H-pyrido[1.2]pyrazinium chloride may be reconstituted by treatment with hydrogen chloride in alcohol-acetone solution.

Example 15

To a stirred mixture of 60 ml. of absolute ethanol and 22.0 g. of 2,2-diethyl-7-methoxy-8-oxo-1,2,3,4-tetrahydro-8H-pyrido[1.2]pyrazinium chloride hydrochloride, 12.4 g. of 1-aminopentane is added. The reaction mixture is stirred and refluxed on the steam bath for 30 minutes. The resultant white solid is filtered hot, washed on the filter with 20 ml. of cold absolute ethanol and dried in the steam cabinet. The 2,2-diethyl-7-methoxy-8-oxo-1,2,3,4-tetrahydro-8H-pyrido[1.2]pyrazinium chloride is obtained as water-soluble crystals decomposing at 257–261° C. to a frothy red liquid.

What is claimed is:

1. A compound of the structural formula

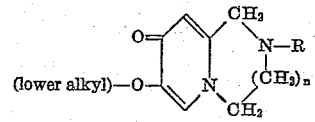

wherein R is a member of the class consisting of lower alkyl and lower hydroxyalkyl radicals and $n$ is a positive integer smaller than 3.

2. A compound of the structural formula

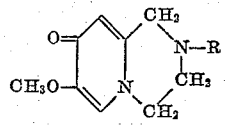

wherein R is a lower alkyl radical.

3. 2 - ethyl - 7 - methoxy - 1,2,3,4 - tetrahydro - 8H-pyrido[1.2]pyrazin-8-one.

4. 2 - propyl - 7 - methoxy - 1,2,3,4 - tetrahydro - 8H-pyrido[1.2]pyrazin-8-one.

5. A compound of the structural formula

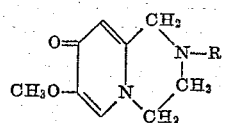

wherein R is a lower hydroxyalkyl radical.

6. 2 - (2 - hydroxyethyl) - 7 - methoxy - 1,2,3,4 - tetrahydro-8H-pyrido[1.2]pyrazin-8-one.

7. 2 - (3 - hydroxypropyl) - 7 - methoxy - 1,2,3,4 - tetrahydro-8H-pyrido[1.2]pyrazin-8-one.

8. 2 - (3 - hydroxybutyl) - 7 - methoxy - 1,2,3,4 - tetrahydro-8H-pyrido[1.2]pyrazin-8-one.

9. A compound of the structural formula
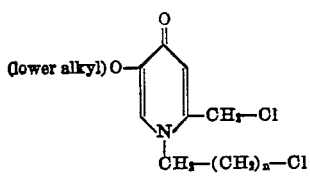
wherein *n* is a positive integer smaller than 3.
10. 1 - (2 - chloroethyl) - 2 - chloromethyl - 5 - methoxy-4-pyridone.
11. 1 - (3 - chloropropyl) - 2 - chloromethyl - 5 - methoxy-4-pyridone.
References Cited in the file of this patent
UNITED STATES PATENTS
2,740,786　Schwab _____ Apr. 3, 1956
OTHER REFERENCES
Campbell et al.: Jour. Organic Chemistry, vol. 15, pp. 221–226 (1950).
Heyns et al.: Chemische Berichte, vol. 87, pages 1377–1384 (1954).

UNITED STATES PATENT OFFICE
CERTIFICATE OF CORRECTION

Patent No. 2,999,860

September 12, 1961

Carl Peter Krimmel

It is hereby certified that error appears in the above numbered patent requiring correction and that the said Letters Patent should read as corrected below.

Column 6, line 25, for "hydroxbutyl)" read -- hydroxybutyl) --; column 7, line 13, for "-7-methyl-1," read -- -7-methoxy-1, --.

Signed and sealed this 24th day of April 1962.

(SEAL)
Attest:

ESTON G. JOHNSON
Attesting Officer

DAVID L. LADD
Commissioner of Patents